United States Patent
Fröberg Olsson et al.

(10) Patent No.: US 9,432,902 B2
(45) Date of Patent: Aug. 30, 2016

(54) CELL SELECTION IN CELLULAR COMMUNICATION SYSTEMS

(75) Inventors: Jonas Fröberg Olsson, Ljungsbro (SE); Sara Landström, Luleå (SE); Peter Ökvist, Luleå (SE); Olle Rosin, Linköping (SE); Arne Simonsson, Gammelstad (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 14/406,466

(22) PCT Filed: Jun. 8, 2012

(86) PCT No.: PCT/SE2012/050622
§ 371 (c)(1),
(2), (4) Date: Dec. 8, 2014

(87) PCT Pub. No.: WO2013/184054
PCT Pub. Date: Dec. 12, 2013

(65) Prior Publication Data
US 2015/0156694 A1    Jun. 4, 2015

(51) Int. Cl.
*H04W 36/00* (2009.01)
*H04W 36/30* (2009.01)
(Continued)

(52) U.S. Cl.
CPC ......... *H04W 36/30* (2013.01); *H04W 36/0083* (2013.01); *H04W 36/24* (2013.01); *H04W 48/20* (2013.01)

(58) Field of Classification Search
CPC  H04W 36/0055; H04W 36/08; H04W 36/30
USPC ................................. 455/436, 437
See application file for complete search history.

(56) References Cited

U.S. PATENT DOCUMENTS

2007/0275722 A1\* 11/2007 Thorson ............ H04W 36/0055
                                                                    455/436
2012/0026972 A1    2/2012 Miao et al.
(Continued)

FOREIGN PATENT DOCUMENTS

WO    WO 2011/130451 A1    10/2011
WO    WO 2012/106847 A1    8/2012

OTHER PUBLICATIONS

Damnjanovic, A. et al. UE's Role in LTE Advanced Heterogeneous Networks. IEEE Communications Magazine. Feb. 2012.
Tian, P. et. al. An Adaptive Bias Configuration Strategy for Range Extension in LTE-Advanced Heterogeneous Networks. Beijing University of Posts and Telecommunications, China, Oct. 14-16, 2011.
(Continued)

*Primary Examiner* — William D Cumming
(74) *Attorney, Agent, or Firm* — Patent Portfolio Builders, PLLC (57)    ABSTRACT

A method for cell selection comprises obtaining of user equipment specific information for a user equipment that is present in a first cell of a first base station. The user equipment specific information comprises information of a prevailing radio situation and information of a present decoding performance. A present capability of the user equipment for handling increased interference and a measure of a cell selection offset required to cover the user equipment by a second cell is estimated from the user equipment specific information. It is decided on modifying a cell selection offset for handover between the first cell and the second cell, in dependence on the estimated present capability of the user equipment for handling increased interference and the cell selection offset required to cover the user equipment by the second cell.

25 Claims, 5 Drawing Sheets

(51) Int. Cl.
*H04W 36/24* (2009.01)
*H04W 48/20* (2009.01)

(56) References Cited

U.S. PATENT DOCUMENTS

| | | |
|---|---|---|
| 2012/0113844 A1 | 5/2012 | Krishnamurthy |
| 2014/0066074 A1* | 3/2014 | Folke ............... H04W 36/08 455/437 |
| 2015/0156694 A1* | 6/2015 | Froberg Olsson .... H04W 36/30 455/436 |

OTHER PUBLICATIONS

3GPP TS 36.331 v1 0.5.0 Release 10, Mar. 2012; abstract; Section 5.5.4.6a.
3GPP TS 36.213 v1 0.5.0 Release 10, Mar. 2012; abstract; Table 7.2.3-1.
Office action in EP application No. 12878434.5 mailed Jun. 2, 2015, pp. 6.
Office action in EP application No. 12878434.5 mailed Oct. 9, 2015.

* cited by examiner

CELL SELECTION IN CELLULAR COMMUNICATION SYSTEMS

TECHNICAL FIELD

The present invention relates in general to network deployment in cellular communication systems, and in particular to arrangements and methods used for cell selection.

BACKGROUND

Range expansion (RE) is a useful feature in Long Term Evolution (LTE) heterogeneous network deployments. To meet expectations and predictions for high data rates and traffic capacity, the use of multiple low-output power sites to complement a macro cell has been developed, resulting in a heterogeneous network. The cells of the low-power nodes are sometimes referred to as micro or pico cells. Traditionally, a terminal connects to the node from which the downlink signal strength is the strongest. Due to differences in transmission power, this strategy does not necessarily result in that the terminal connects to the node with the lowest path loss, thereby selecting a node that does not provide the best uplink data rates.

The uptake area of a low-power node can be expanded without increasing the output power of the node by adjusting a cell selection offset to the received downlink signal strength during handling of the cell selection procedures. Such increase in the uptake area of a node is sometimes referred to as range expansion, range extension or cell selection offset. One purpose for doing RE may be to offload the macro layer. If terminals are connecting to low-power nodes, the high-power node capacity is saved for other terminals to use. RE can therefore dynamically be applied to balance load between different layers.

Another purpose for doing RE may be to improve the UpLink (UL) performance for a User Equipment (UE) in a transition zone. The transition zone is the zone in which the DownLink (DL) signal strength from the macro cell base station is higher than the DL signal strength from the micro cell base station, but the path loss to the micro cell base station is lower than to the macro cell node. RE thereby improves the uplink received signal and link bitrate for the UEs that are subjects for the RE.

However, as a drawback RE degrades the DL. This is due to the fact that the UEs are connecting to the low power node, resulting in lower received signal strength and lower link bitrate in the DL, or more precisely bitrate per channel use. Moreover, for large RE the control signalling, such as synchronization signals, Cell-specific Reference Signals (CRS), from the macro cell can cause severe interference to UEs, connected to the micro cell, within the transition zone.

RE is typically applied by setting a cell selection offset parameter to a desired value. In the 3GPP standard, this parameter is called "cellIndividualOffset", see e.g. [1].

When RE is applied, the typical approach is to modify the cell selection offset parameter for all UEs, which results in that all UEs in the transition zone will make a handover to the micro node. This means that these UEs will experience more interference in DL from interfering nodes compared to what they experienced before the handover. Therefore, the total gain in radio resource utilization by applying RE is dependent on how capable the UEs are to mitigate interference. Thus, if there is a large fraction of UEs in the transition zone that are poor at interference suppression, then the decision of applying RE may become costly in terms of radio resources. In some scenarios a predicted gain may even result in a loss.

For UEs supporting release 10 of the 3GPP specifications, there will be some UEs having good interference suppression capability. Those UEs will likely belong to a new UE class, or category, of UEs supporting larger RE than other UEs. RE based on UE class can thus easily be performed by modifying the cell selection offset parameter only for UEs belonging to such a UE class. However, although two UEs belong to the same UE class there can still be large differences in their interference suppression capabilities.

A general problem with application of range expansion in prior art cellular communication systems is that the total gain in radio resource utilization is difficult to predict and control.

SUMMARY

A general object of the present invention is to improve the possibilities to predict and control the gain in radio resource utilization when performing cell selection in cellular communication systems. This object is achieved by methods and nodes according to the enclosed independent patent claims. Preferred embodiments are defined by the dependent patent claims. In general words, in a first aspect, a method for cell selection in a cellular communication system is concerned. The cellular communication system has a first base station with a first cell and at least one second base station with a respective second cell. The method comprises obtaining, in one of the first base station and the second base station, of user equipment specific information for a user equipment that is present in the first cell. The user equipment specific information comprises information of a prevailing radio situation of the user equipment and information of a present decoding performance of the user equipment. In one of the first base station, the second base station and a node connected to at least one of the first base station and the second base station, a present capability of the user equipment for handling increased interference and a measure of a cell selection offset required to cover the user equipment by the second cell is estimated from the user equipment specific information. In one of the first base station, the second base station and a node connected to at least one of the first base station and the second base station, it is decided on modifying a cell selection offset for handover between the first cell and the second cell, in dependence on the estimated present capability of the user equipment for handling increased interference and the cell selection offset required to cover the user equipment by the second cell.

In a second aspect, a node in a cellular communication system is concerned. The cellular communication system has a first base station with a first cell and at least one second base station with a respective second cell. The node is one of the first base station, the second base station and a node connected to at least one of the first base station and the second base station. The node comprises an obtaining section, an estimator and a decision section. The obtaining section is configured for obtaining user equipment specific information for a user equipment that is present in the first cell. The user equipment specific information comprises information of a prevailing radio situation of the user equipment and information of a present decoding performance of the user equipment. The estimator is communicationally connected to the obtaining section. The estimator is configured for estimating a present capability of the user equipment for handling increased interference and a measure of a cell selection offset required to cover the user equipment by the second cell, from the user equipment specific information. The decision section is communicationally connected to the estimator. The decision section is configured for deciding on modifying a cell selection offset for handover between the first cell and the second cell, in dependence on the estimated present capability of the user equipment for handling increased interference and the cell selection offset required to cover the user equipment by the second cell.

One advantage with the present invention is that cell selection mechanisms can be better adapted to the present radio situation and to the UE capabilities, thereby allowing a higher utilization of the available radio resources. Further advantages are described in connection to the different embodiments of the detailed description.

BRIEF DESCRIPTION OF THE DRAWINGS

The invention, together with further objects and advantages thereof, may best be understood by making reference to the following description taken together with the accompanying drawings, in which.

DETAILED DESCRIPTION

Throughout the drawings, the same reference numbers are used for similar or corresponding elements.

Figure 1:
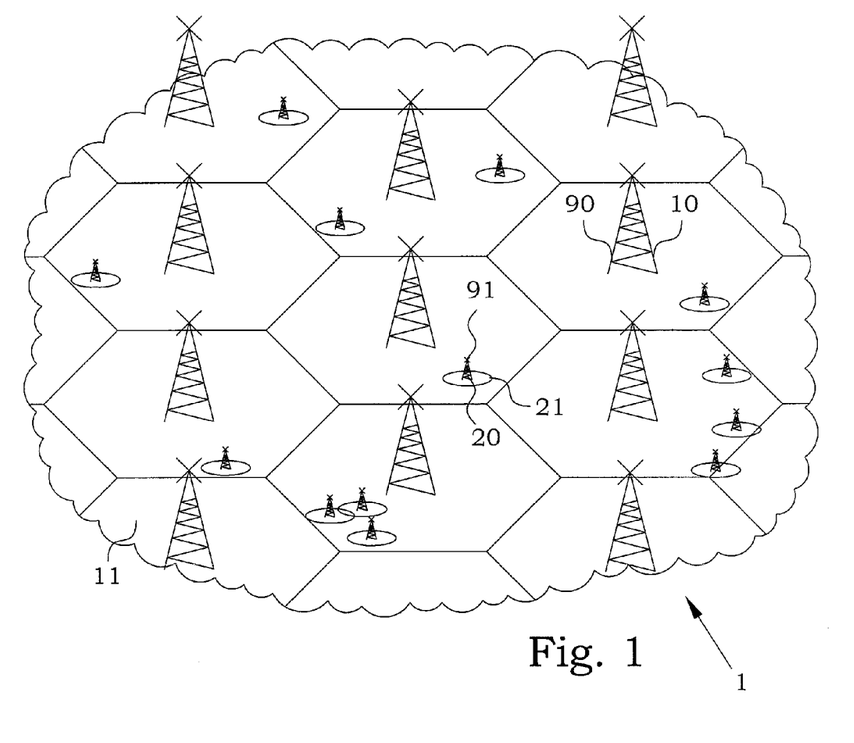
FIG. 1 is a schematic illustration of a cellular communication system with cells of different sizes.

A system in which RE can be applied is illustrated schematically in FIG. 1. An area of a cellular communication system 1 is covered by a number of cells 11 of a number of respective first base stations 90. In the same area, also second base stations 91 are present, being connected to respective cells 21. In this embodiment, the first base station 90 transmits radio signals with a power that is considerably higher than for radio signals transmitted by said second base station 91. The first base stations 90 are therefore in the present embodiment considered as high-power base stations 10 or macro base stations. Similarly, the second base stations 91 are in the present embodiment considered as low-power base stations 20 or micro, nano or pico base stations. A high-power base station has a significantly higher possible output power than a low-power base station, typically at least twice the power. A macro cell base station has typically an output power that is 4-5 times higher than for a base station of a micro cell, and a macro cell base station has typically an output power that is about 20 times higher than for a base station of a pico cell.

Figure 2:
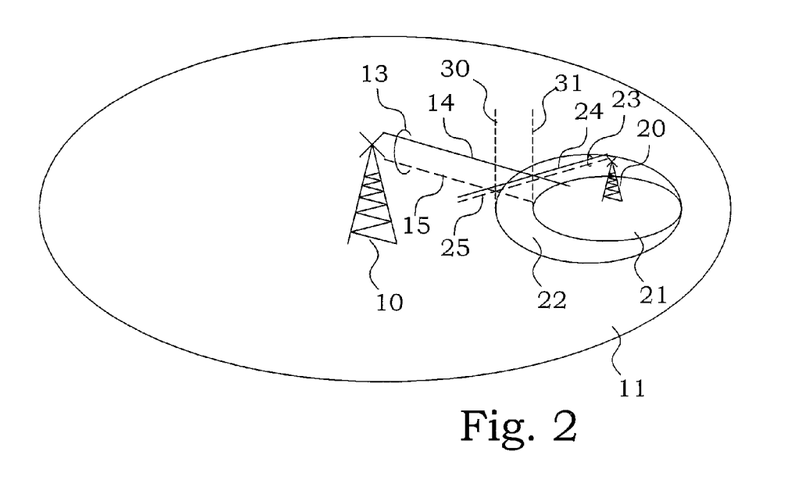
FIG. 2 is a schematic illustration of the relation between a macro cell and a micro cell.

FIG. 2 illustrates an example of the radio conditions in connection to a high-power base station 10 and a low-power base station 20. The high-power base station 10 is illustrated to have a communication link 13 comprising a DL link 14 and an UL link 15. Similarly, the low-power base station 20 is illustrated to have a communication link 23 comprising a DL link 24 and an UL link 25. Traditionally, when no cell selection offset is used, a terminal connects to the node from which the downlink signal strength is the strongest. This means that a traditional cell 21 associated with the low-power base station 20 has its border at a position 31 where the signal strength of the DL 14 of the high-power base station 10 equals the signal strength of the DL 24 of the low-power base station 20.

It can, however, be noticed that even outside the border of the cell 21 at position 31, the UL 25 to the low-power base station 20 is better than the UL to the high-power base station 10. There is therefore another position 30 where the signal condition of the UL 15 to the high-power base station 10 equals the signal condition of the UL 25 to the low-power base station 20. The area between the positions 30 and 31 thus constitutes an area 22 that is of interest for range extension purposes, by adapting a cell selection offset. However, the question of whether or not range extension is to be performed is also dependent on expected gains in load sharing and uplink performance.

In order to avoid the disadvantages mentioned in the background, where the interference situation could be turned into a situation that is difficult or even impossible to handle, the application of RE should be restricted. In one embodiment, RE is applied only if UE is estimated to have good capability for handling the increased interference. This capability is preferably a capability evaluated for each actual UE and for the present conditions for the respective UE. The capability can in such an embodiment be estimated from one or more of the following information elements: CSI (Channel State Information) reports, outer-loop link adaptation state and/or measurement reports, i.e. RSRP (Reference Signal Received Power).

In one embodiment, it is decided on modifying a cell selection offset for handover between one cell and another cell, in dependence on an estimated present capability of the user equipment in question for handling an expected increased interference. This means that the present situation and interference suppression capabilities of a user equipment is taken into account. The decision is also made in dependence on a cell selection offset that is required to cover the user equipment in question by the new cell. In other words, the size of the cell selection offset modification is important to judge whether or not a RE can be useful at all. As mentioned before, the decision on modifying the cell selection offset is also preferably performed in further dependence of expected gains in load sharing and uplink performance. If there are no expected benefits, the RE becomes unnecessary.

The useful information for the decision is user equipment specific information for the user equipment that is present in the area of consideration. The user equipment specific information is information of a prevailing radio situation of the user equipment and information of a present decoding performance of the user equipment. In one embodiment, such user equipment specific information comprises a channel state information report, link adaptation, a handover measurement report, and/or sounding reference symbols power measurements. Such information is obtained in the node making the decision, possibly assisted by other nodes in the system. "Obtaining information" should here be understood to comprise estimating and determining information as well as receiving information, and all combinations thereof. In other words, the source of the basic information could be provided in any part of the system. If the information is present in a node different from the node making the "obtaining" step, the information may be processed fully or partly before it is transmitted to the node in question. From this knowledge, a present capability of the user equipment for handling increased interference is estimated. Also, a measure of a cell selection offset required to cover the user equipment by the cell being subject for considerations about RE is estimated, from the collected user equipment specific information. The interference suppression capability of the user equipment and the required selection offset are then used for making the actual decision, as described above.

Figure 3:
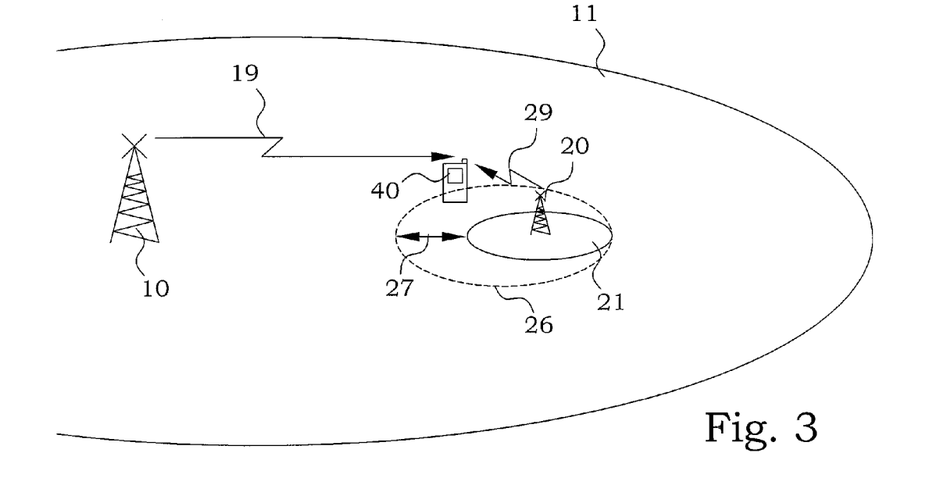
FIG. 3 is a schematic illustration of the principles of an embodiment of a cell selection method and arrangement.

In FIG. 3, the principles of one embodiment of a cell selection method and arrangement are illustrated. This particular embodiment utilizes an individual UE capability based RE. A high-power base station 10 is associated with a cell 11, in this embodiment a macro cell. The high-power base station 10 communicates with a UE 40, e.g. by control signalling 19. Also pilot reference signals are sent from all base stations for handover measurements, channel estimation and receiver equalization. This reference signalling comprises known sequences of signals with known output power, which the UE can perform measurements on. In LTE reference symbols (RS) are sent in a pattern of Orthogonal Frequency-Division Multiplexing (OFDM) symbols. A low-power base station 20, with an associated cell 21, in this embodiment a micro cell, also transmits control signals 29, detectable by the UE. The UE is presently connected to the macro cell 11 but is within a short distance from the cell border to the micro cell 21.

UE decoding performance can in this embodiment be estimated as a combination of the CSI report and the outer-loop link adaptation adjustment. Outer-loop adjustment is a well-known component in the link adaptation where feed back of DL decoding result, i.e. AckNack feed back, are used as input to a control loop. The control loop has a Block Error Rate (BLER) target that it attempts to maintain by producing offset values to the link adaptation. A negative outer-loop adjustment typically means that the CSI report from the UE was too optimistic, while a positive adjustment means that the report was too pessimistic.

The chosen transport format by the link adaptation thus depends on the UE decoding capability and how well it can mitigate interference. The chosen transport format can be converted to Send Bit Information (SBI) as the number of information bits transmitted to the UE by said first base station divided by the number of resource elements utilized for said UE by said first base station. The SBI can be seen as a kind of "transmitted spectral efficiency" and has a unit of bits/symbol. The SBI measure is somewhat similar to the efficiency defined in [2], but the difference is that efficiency only accounts for the UEs own opinion of its decoding capability. At a specific geometry, a UE that have good interference suppression capability will have higher SBI than a UE having worse interference suppression capability.

When the term "geometry" is used in the present disclosure, the word should be interpreted as a geometry in a radio signal space. A measurement geometry is therefore to be considered as the radio signal relation to a number of base stations in the neighbourhood. The geometry can be considered as the ratio between serving RSRP and the sum of interfering RSRP. Possibly some offset (for the RSRP) could be applied if one wants to take into account different power offsets between reference symbols and data symbols used in different cells.

In the embodiment of FIG. 3, a number of functions are performed for each UE available in the area, of which UEs just one is visible in the figure. The UE performs handover measurements. These measurements comprise e.g. Reference Signal Received Power (RSRP) from connected and neighbour cells. The UE compiles the measurements in a Radio Resource Control (RRC) handover measurement report, which is sent to the Enhanced Node B (eNB), i.e. the high-power base station 10. The macro eNB receives the RRC handover measurement reports from the UE, including RSRP from connected and neighbour cells. From the RSRP measurement, geometry for the UE can be calculated.

A RE depth $D_{RE}(i)$ for the micro cell i 21 is calculated. The smallest RE depth is the cell selection offset that is required to bring the UE within an area where a handover to the micro cell 21 will be performed. This is illustrated by the double arrow 27, in FIG. 3. The RE micro cell after such a cell selection offset is illustrated by the broken line 26. In the present embodiment, the RE depth is calculated as:

$$D_{RE}(i) = RSRP_{macro} - RSRP_i$$

Then an average SBI for the UE 40 is calculated being a ratio of the number of information bits transmitted by the user equipment divided by the number of resource elements utilized by the user equipment in the DL. In the present embodiment, the SBI is utilized as a first comparison measure deduced from the estimated present capability of the user equipment to handle increased interference.

In a somewhat more general embodiment, the first comparison measure is estimated as a function of a send bit information value.

In the embodiment of FIG. 3, a threshold function, which is a function of the RE depth, is then selected. This selection of threshold is made from the relation between SBI and geometry. If this particular UE under consideration has a high SBI for the given geometry in the serving cell, a more aggressive setting threshold function T will preferably be used. If this particular UE under consideration has a low SBI for the given geometry in the serving cell, a less aggressive setting threshold function T will preferably be used. The quantity $T(D_{RE}(i))$ is in this embodiment a second comparison measure deduced from the cell selection offset required to bring the UE within the cell area of the micro cell 21.

In a somewhat more general embodiment, the second comparison measure is estimated as a function of a range expansion depth for the user equipment. The range expansion depth is here defined as the difference between a received power of a pilot signal from the base station to which the user equipment is connected and a received power of a pilot signal from the base station to which a handover is under consideration.

Again, in the embodiment of FIG. 3, if SBI for the UE is above some threshold:

$$SBI > T(D_{RE}(i)),$$

then RE is applied for the UE by setting the cell selection offset, e.g. the cellIndividualOffset parameter in 3GPP systems, to the desired value. If the threshold is not reached, RE is not applied. In other words, the deciding on modifying a cell selection offset is performed individually for the user equipment and only if the comparison between the first comparison measure and the second comparison measure indicates that the user equipment has a capability of handling the increased interference caused by such cell selection offset that is better than a preselected level.

In different embodiments, the threshold can further be a function of the serving RSRP to capture SBI reduction due to distance from serving cell. Moreover, the threshold can also be a function of the RSRP to interfering micro to estimate SBI reduction due to the new or at least possibly new distance to a serving cell.

The threshold function can preferably be obtained from statistics in the eNB, such as the average SBI for a particular RE depth. In such a case, an offset can be added to the right-hand side of the inequality here above. The offset can be a static configurable variable or an adaptable variable, e.g. a result of a self-optimizing procedure. This would mean that UE needs to have a better offset, in terms of SBI, than UE in average or some other percentile. Such an offset can also be utilized in other scenarios.

In a further embodiment, the second comparison measure is estimated as a function that is further dependent on differences in power allocations for Physical Downlink Shared CHannel (PDSCH) and reference symbols between the concerned base stations.

In alternative embodiments, the above comparison can be expressed mathematically in other ways. A threshold value T(SBI) can instead be calculated based on the SBI. Such a threshold value would in such a case express a range expansion depth at which the user equipment at the present scenario can handle the increased interference. The requested RE depth $D_{RE}(i)$ can then be compared to such a threshold value and if the requested RE depth is smaller than the threshold value, a RE can be performed with advantage. In further alternative embodiments, different types of functions depending on the SBI or the RE depth can be compared to each other in different configurations.

Figure 4:
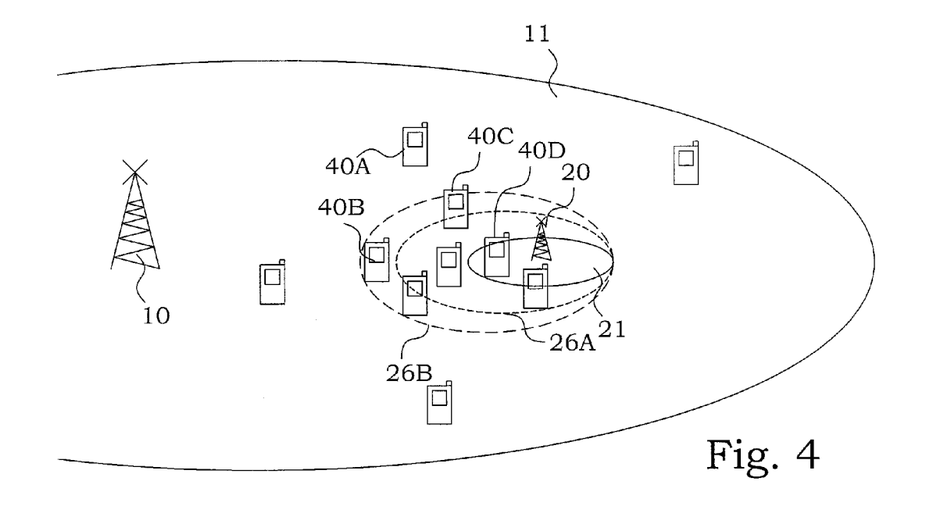
FIG. 4 is a schematic illustration of the principles of another embodiment of a cell selection method and arrangement.

In FIG. 4, the principles of another embodiment of a cell selection method and arrangement are illustrated. This particular embodiment utilizes a minimum UE capability based RE. In this embodiment, equal RE expansion is performed for all UEs in the cell. The problem is to find a suitable RE to be applied for the two cells. In the FIG. 4, a number of user equipments are illustrated 40A-D, positioned at different positions within the cell 11. A present size of the micro cell 21 is illustrated with a full line, while two possible cell borders 26A and 26B with two different cell-specific RE applied are illustrated by dashed lines.

The user equipment 40D is positioned within the original cell 21 of the base station 20 and will not be affected by a RE except for experiencing a higher competition for the resources of the micro cell. The user equipment 40C has a geometry that is within the inner one 26A of the cell borders. If a RE is performed according to one of the two illustrated candidates, the user equipment 40C will appear within the new micro cell and will perform a handover to the micro cell. The user equipment 40B will also make a handover if the larger one of the proposed REs corresponding to the border 26B is applied, but will stay in the macro cell 11 if the smaller RE is applied. Finally, the user equipment 40A will not be affected at all by any of the RE alternatives and will remain in the macro cell 11. The task for the controlling node in this embodiment is to find a suitable size of the RE in order to achieve the largest possible benefits.

The functions can be summarized as follows. The macro eNB, i.e. base station 10, receives RRC handover measurement reports from the UEs 40A-D including RSRP from connected and neighbour cells. In the present embodiment, from the RSRP measurement the geometry for each individual UE can be calculated. The RE depth $D_{RE}(i)$ for micro cell i is calculated as:

$$D_{RE}(i) = RSRP_{macro} - RSRP_i.$$

The RSRP does not encounter for load and actual interference, the received RSRP level from neighbour cell (the micro cell in this case) is an estimate of interference level at full load. To improve the actual interference estimate the actual channel utilization (fraction of used resource block in LTE) can be retrieved from the neighbour cell and encountered for.

In other embodiments, the geometry can be obtained by other means as well. Sounding reference symbols (SRS) are one such means, where an eNB may cooperate and measure on SRS from UEs belonging to other cells. Measures are exchanged between eNBs to be able to calculate the geometry.

The average SBI is calculated for each UE.

A threshold function T is selected from the relation between SBI and geometry. If the UE under consideration has a high SBI for the given geometry in the serving cell, a more aggressive setting threshold function T can be used. A margin $SBI_{margin}$ between SBI and the threshold is calculated:

$$SBI_{margin} = SBI - T(D_{RE}(i))$$

The task is then to find the largest RE such as $SBI_{margin} > 0$ for all UEs within the created RE zone. In other words, the deciding on modifying a cell selection offset is thus performed collectively for all user equipments. A magnitude of the cell selection offset is adapted to give a cell area of the micro cell that only comprises user equipments for which the comparison between the first comparison measure, i.e. in this embodiment the SBI, and the second comparison measure, in this embodiment the threshold, indicates that the user equipment has a certain interference handling capability for an increased interference caused by such cell selection offset being worse than a pre-selected level. If such a RE can be found, then the RE can be applied by setting the cell selection offset, e.g. the "cellIndividualOffset" parameter, to a desired value. If no RE can be found that fulfils the requirement, RE is not applied. Also in this case, an offset can be added to the right-hand side of the inequality here above. The offset can be a static configurable variable or an adaptable variable, e.g. a result of a self-optimizing procedure. This can also be seen as changing the definition of the threshold such that:

$$T(D_{RE}(i)) = T(D_{RE}(i)) - K,$$

where K is a configurable or adjustable constant or variable.

In an alternative embodiment, it can be allowed for a smaller fraction of the UEs that are moved to the micro cell, not to have a full capacity to compensate for the increased interference level. If the benefits for moving the UE are very high, then a minor quality reduction for just a minor part of the UEs may be considered as acceptable. In other words, a magnitude of the cell selection offset is adapted to give a cell area of the micro cell that comprises less than or equal to a predetermined fraction of user equipments in the user equipments under consideration for which the comparison between the first comparison measure and the second comparison measure indicates that the user equipment has a capability of handling the increased interference caused by such cell selection offset that is worse than a pre-selected level. In the embodiment of FIG. 4, such a fraction can be considered to be zero.

In the embodiment of FIG. 4, all user equipments in the macro cell that possibly are influenced by a cell selection offset for the micro cell are considered. However, in another alternative embodiment, only a part of the user equipments are considered. A set of user equipments in the macro cell is then selected and the process is performed on such a set of user equipments. In a particular embodiment, the set of user equipments comprises user equipments of a specific model or user equipments having a specific number of antennas.

The set of user equipments can in alternative embodiments also be selected among the user equipments of both the micro and the macro cell. In a particular scenario a user equipment has earlier been handed over to the micro cell due to an adjustment of the cell selection offset. A new user equipment appears in the macro cell. It is not of benefit just to add the new user equipment to the micro cell, but it is advantageous if one could exchange the two user equipments. By including both user equipments in the set of user equipments under consideration, such rearrangements can be performed.

In the embodiments above, the system that has been considered a system of a macro cell and a micro (or nano or pico) cell. In other words, a first base station has been a high-power base station and a second base station has been a low-power base station. However, the principles described here above can also be applied between cells of similar or equal size. If one cell has a present load that is considerably higher than a neighbouring cell, it might be of interest of load sharing purposes for the neighbouring cell to increase its cell area and take over a few of the user equipments. If the base stations transmit radio signals with essentially the same power, however, there will be no expected benefit in the UL performance.

The low-power base station may also be the base station that actually performs the cell selection procedures. This could be the case, e.g. if a micro cell experiences a very high load, while a neighbouring macro cell has more available capacity. In such a situation, the low-power base station may modify the cell selection offset e.g. to reduce or remove a previous range extension. The procedure may even be used for applying a "negative" range extension, i.e. to reduce the cell to sizes smaller than the original one.

In all these different embodiments, radio resources will be saved and bitrate will be improved. If the procedures are used in e flexible way allowing both extensions and reductions of ranges, network optimization cost could be saved due to a self-optimizing RE.

The principles may of course be possible to apply on systems having several cells that can be subjects for range extension.

Figure 5:
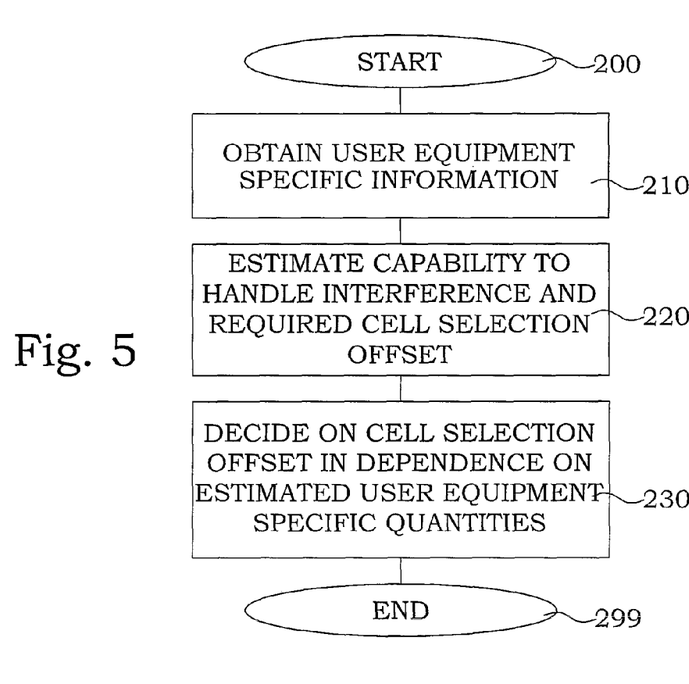
FIG. 5 is a flow diagram of steps of an embodiment of a method for cell selection.

FIG. 5 illustrates a flow diagram of steps of a method for cell selection in a cellular communication system. The cellular communication system has a first base station with a first cell and at least one second base station with a respective second cell. The process starts in step 200. In step 210, in one of the first base station and the second base station, user equipment specific information for a user equipment that is present in the first cell is obtained, i.e. received and/or determined. The user equipment specific information comprises information of a prevailing radio situation of the user equipment and information of a present decoding performance of the user equipment. In step 220, in the first base station, the second base station and/or a node connected to the first base station and/or the second base station, a present capability of the user equipment for handling increased interference is estimated from the user equipment specific information. Also, a measure of a cell selection offset required to cover the user equipment by the second cell is estimated from the user equipment specific information. In step 230, in the first base station, the second base station and/or a node connected to the first base station and/or the second base station, it is decided on modifying a cell selection offset for handover between the first cell and the second cell. This decision is performed in dependence on the estimated present capability of the user equipment for handling increased interference and the cell selection offset required to cover the user equipment by the second cell. The process ends in step 299.

Figure 6:
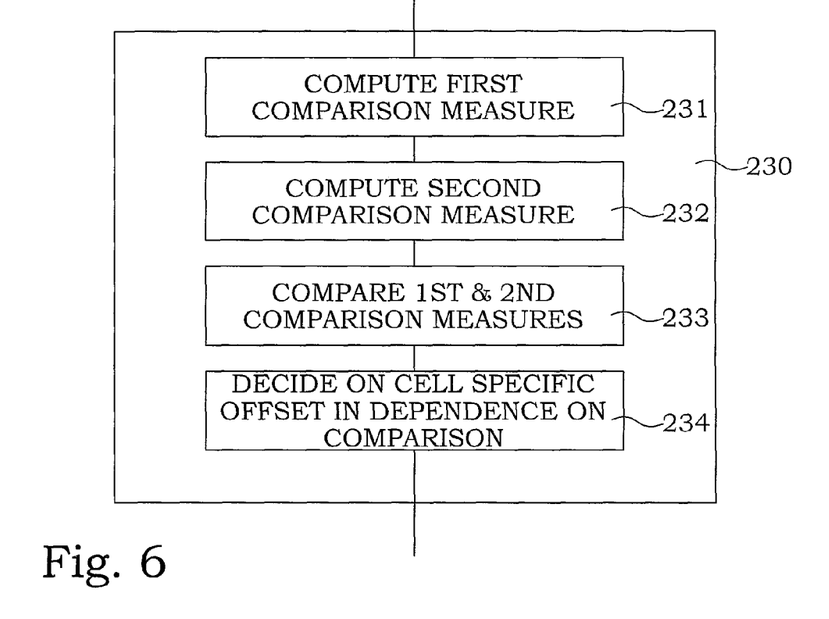
FIG. 6 is a flow diagram of steps of an embodiment of the step 230 of FIG. 5.

In FIG. 6, a particular embodiment of step 230 of FIG. 5 is illustrated more in detail. In step 231, a first comparison measure is computed. Preferably, such a first comparison measure is estimated as a function of a send bit information value. In step 232, a second comparison measure is computed. Preferably, such a second comparison measure is estimated as a function of a range expansion depth for the user equipment. In a further preferred embodiment, the second comparison measure could also be a function of geometry etc., as discussed further above. In step 233, the first and second comparison measures are compared and in step 234, a decision on modifying the cell selection offset is taken based on the outcome of the comparison.

Geometry and SBI statistics can be gathered globally, per cell, per UE model, or per UE. Such statistics can be used to find good RE settings, i.e. cell selection offset values, that similarly can be applied at these different levels.

One example to compile the statistics is per UE model. It is expected that different UE models behave differently. Gathering geometry and SBI statistics per UE model may therefore improve the prediction of a specific UEs ability to handle interference. This information can be used to set UE model specific thresholds (T).

Through the handover measurements, geometry can be calculated both for the present cell and the considered target cell. Most important is the change of serving cell which, when doing handover to a low power node, often will result in the macro becoming a strong interferer. This is reflected by the comparison of RSRP between the two cells involved in the handover as in the embodiments. The number of interferers and their strength can also affect the possibilities to handle the interference variations. Information about the interferers can be extracted from the handover measurements and can be used to complement the geometry calculations. The information about interferers can also be deduced by using SRS and cooperating eNB, or by other means.

The number of UE antennas is expected to increase which will improve the UE interference management. Therefore knowledge of the number of UE antennas together with the information of the interferers can be combined to improve the prediction of the UEs behaviour in the new cell.

In other words, in a preferred embodiment, at least one of the first comparison measure and the second comparison measure is computed in further dependence on a measurement geometry, a model of the user equipment, the number of UE antennas, the load in the respective base stations, the number and position of interferers and/or properties of radio path channel. Also information such as UE antenna design and UE antenna surrounding would be of benefit for computing the comparison measures, if such information is available.

The channel conditions also affect how well interference can be managed. Thus, a further improvement would be to map interference management ability to different locations or type of areas, such as indoor and outdoor, dense urban and rural. Thus, in a preferred embodiment, the properties of radio path channel comprises information about line-of-sight or non-line-of-sight, base station antenna deployment and/or base station antenna design. Also the radio environment may be of benefit to know. The first comparison measure and/or the second comparison measure is therefore preferably computed utilizing gathered statistics concerning estimated present capability of user equipments for handling increased interference under different circumstances. By collecting statistical measures per UE or UE category of first and/or second comparison per cell the above characteristics will be captured. That is for example, if one UE has better receiver suppression capability for channels with large delay spread (such as typical urban environments) while another UE is better in environments with small delay spread (such as rural area) the method will adopt to this per cell depending to average delay spread in each cell and apply a per UE and per cell individual RE. The same will be the case for fraction of line-of-site traffic per cell and base station antenna.

Once a serving cell change has taken place, the SBI of the UE in the new cell could be measured and used to adjust the threshold. The geometry is also already known from the handover measurements. In other words, a preferred method for cell selection additionally comprises the receiving of feed-back information about capability for handling increased interference from user equipments having performed a handover to the second cell due to a modified cell selection offset after the handover has been completed. The feed-back information is utilized for refining the computation of the first comparison measure and/or the second comparison measure.

Figure 7:
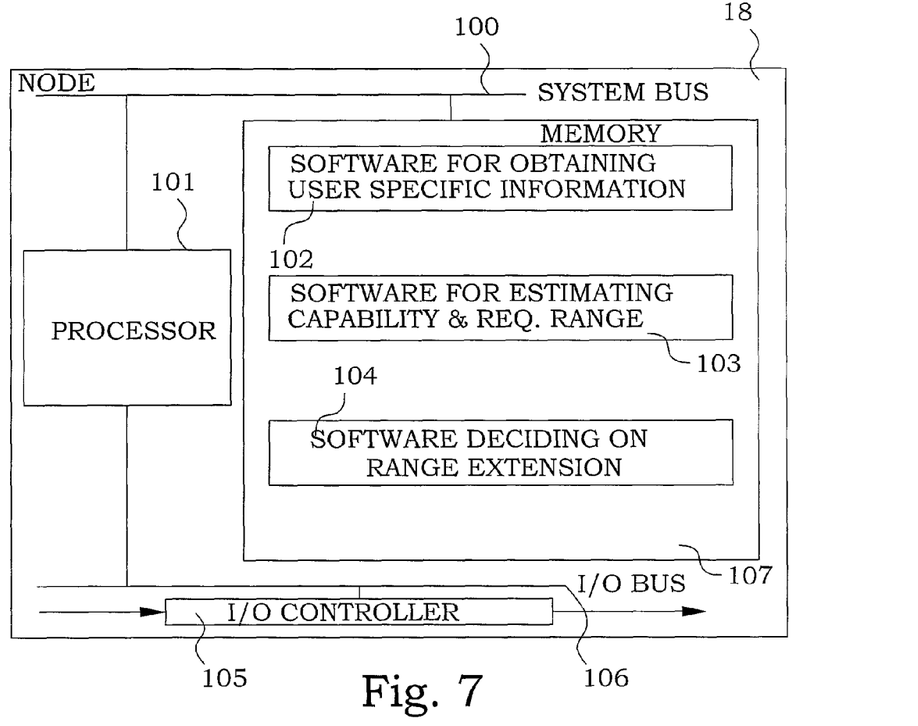
FIG. 7 is a block diagram of an embodiment of an implementation of a cell selection method in a node of a cellular communication system.
Figure 8:
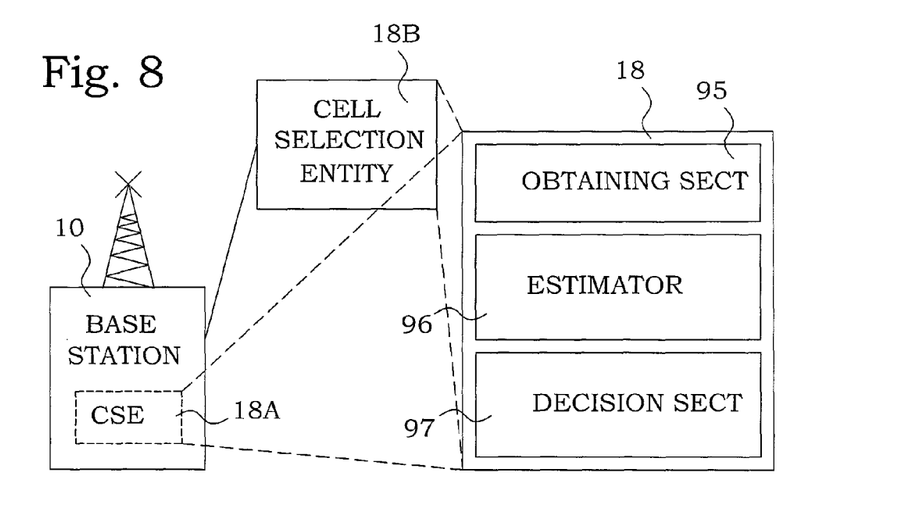
FIG. 8 is a schematic illustration of two embodiments of the implementations of a cell selection entity.

As an implementation example, FIG. 7 is a block diagram illustrating an example embodiment of a node 18 in cellular communication system having capabilities to manage cell selection offsets. Such nodes can be implemented in different parts of the system as will be discussed further below. This embodiment is based on a processor 101, a memory 107, a system bus 100, an input/output (I/O) controller 105 and an I/O bus 106. In this embodiment the received user specific information is received by the I/O controller 105 and is stored in the memory 107. The I/O controller 105 also controls the issue of the final decision. The processor 101, which may be implemented as one or a set of cooperating processors, executes software components stored in the memory 107 for performing the cell selection. The processor 101 communicates with the memory 107 over the system bus 100. In particular, software component 102 may implement the functionality of obtaining the user specific information of block 95 (FIG. 8). Software component 103 may implement the functionality of estimating capabilities and required cell selection offsets of block 96 (FIG. 8). Software component 104 may implement the functionality of making the cell selection decision of block 97 (FIG. 8).

FIG. 8 illustrates two embodiments of a node for cell selection. In one embodiment, a base station 10 comprises a cell selection entity 18A having the components for performing the cell selection. One embodiment of such a cell selection entity is the node of FIG. 7. The cell selection entity 18A utilizes the communication that the base station has with the user equipments as well with other base stations to obtain the necessary information.

The cell selection entity 18A is illustrated in an enlarged portion at the right in the figure. The cell selection entity 18A comprises an obtaining section 95. The obtaining section 95 is configured for obtaining user equipment specific information for a user equipment that is present in the first cell. The cell selection entity 18A also comprises an estimator 96 that is communicationally connected to the obtaining section 95. The estimator 96 is configured for estimating a present capability of the user equipment for handling increased interference and a measure of a cell selection offset required to cover the user equipment by the second cell. A decision section 97 is communicationally connected to the estimator 96. The decision section 97 is configured for deciding on modifying a cell selection offset for handover between the first cell and the second cell, in dependence on the estimated present capability of the user equipment for handling increased interference and the cell selection offset required to cover the user equipment by the second cell.

In the same figure, another embodiment is also illustrated. Here the cell selection entity 18B is implemented as a separate unit with communication possibilities to the base station 10.

Figure 9:
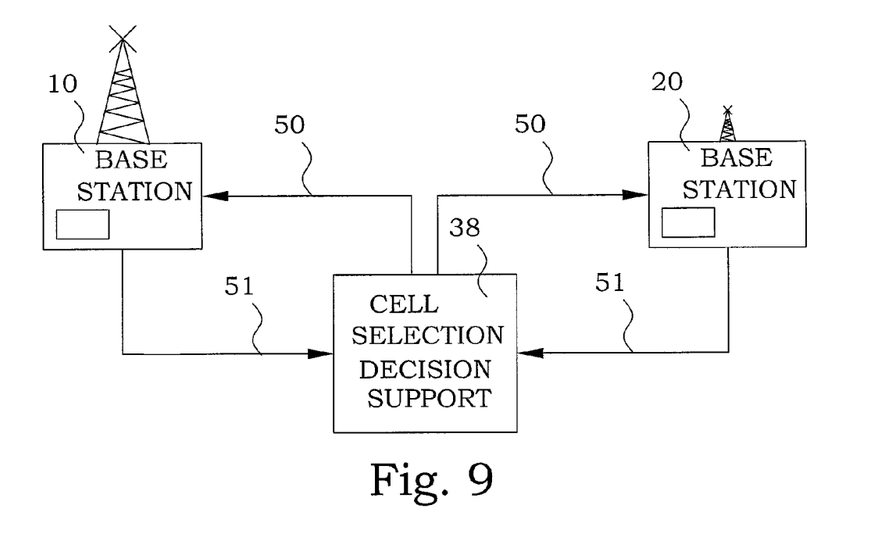
FIG. 9 is a schematic illustration of an embodiment of a cell selection system with a cell selection decision support unit.

FIG. 9 illustrates another embodiment of a system for cell selection. The base stations 10 and 20 have each one of them a cell selection entity 18A. However, there is a common node, a cell selection decision support node 38, that assists in finding appropriate thresholds for the decisions. To that end, the base stations 10, 20 send input information 51 to the cell selection decision support node 38. This information may comprise UE specific information, such as e.g. SBI, geometry etc. The information may also comprise cell specific information, such as e.g. load. The cell selection decision support node 38 processes the information and returns output information 50 to the base stations 10, 20. Such output information may e.g. comprise definitions about how to deduce a relevant threshold from a certain geometry.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

ABBREVIATIONS

BLER Block Error Rate
CRS Cell-specific Reference Symbol
CSI Channel State Information
DL Downlink
eNB Enhanced Node B
LTE Long Term Evolution
OFDM Orthogonal Frequency-Division Multiplexing
PDSCH Physical Downlink Shared Channel
RE Range Expansion
RRC Radio Resource Control
RS Reference Symbols
RSRP Reference Signal Received Power
SBI Send Bit Information
SRS Sounding reference symbols
UE User Equipment
UL Uplink

REFERENCES

[1] 3GPP "Radio Resource Control (RRC)", TS 36.331, sects. 5.5.4.4 and 6.3.5.
[2] 3GPP "E-UTRA Physical layer procedures", TS 36.213, sect. 7.2.3.

The invention claimed is:

1. A method for cell selection in a cellular communication system having a first base station with a first cell and at least one second base station with a respective second cell, said method comprising the steps of:
obtaining, in one of said first base station and said second base station, user equipment specific information for a user equipment being present in said first cell, said user equipment specific information comprising information of a prevailing radio situation of said user equipment and information of a present decoding performance of said user equipment;
estimating, in one of said first base station, said second base station and a node connected to at least one of said first base station and said second base station, a present capability of said user equipment for handling increased interference and a measure of a cell selection offset required to cover said user equipment by said second cell, from said user equipment specific information;
deciding, in one of said first base station, said second base station, and a node connected to at least one of said first base station and said second base station, on modifying a cell selection offset for handover between said first cell and said second cell, in dependence on said estimated present capability of said user equipment for handling increased interference and said cell selection offset required to cover said user equipment by said second cell, wherein said deciding on modifying the cell selection offset is performed by comparing a first comparison measure computed from said estimated present capability of said user equipment and a second comparison measure computed from said required cell selection offset; and
receiving feed-back information about capability for handling increased interference from user equipments having performed a handover to said second cell due to a modified cell selection offset after said handover has been completed, wherein said feed-back information is utilized for refining the computation of at least one of said first comparison measure and said second comparison measure.

2. The method according to claim 1, wherein said step of deciding on modifying the cell selection offset is performed in further dependence of expected gains in load sharing and uplink performance.

3. The method according to claim 1, wherein said user equipment specific information comprises at least one of a channel state information report, link adaptation, a handover measurement report, and sounding reference symbols power measurements.

4. The method according to claim 1, wherein said first comparison measure is estimated as a function of a send bit information value, said send bit information value being a ratio of a number of information bits transmitted to said user equipment by said first base station divided by a number of resource elements utilized for said user equipment by said first base station.

5. The method according to claim 1, wherein said second comparison measure is estimated as a function of a range expansion depth for said user equipment, said range expansion depth being a difference between a received power of a pilot signal from said first base station and a received power of a pilot signal from said second base station.

6. The method according to claim 5, wherein said second comparison measure is estimated as a function being further dependent on differences in power allocations for Physical Downlink Shared Channel and reference symbols between said first base station and said second base station.

7. The method according to claim 1, wherein said step of deciding on modifying the cell selection offset is performed individually for said user equipment and only if said comparison between said first comparison measure and said second comparison measure indicates that said user equipment has a capability of handling the increased interference caused by such cell selection offset that is better than a preselected level.

8. The method according to claim 1, wherein said steps of obtaining and estimating are performed for a set of user equipments in at least one of said first cell and said second cell;
wherein said step of deciding on modifying the cell selection offset is performed collectively for all user equipments in said set of user equipments; and
wherein a magnitude of said cell selection offset being adapted to give a cell area of said second cell that comprises less than or equal to a predetermined fraction of user equipments in said set of user equipments for which said comparison between said first comparison measure and said second comparison measure indicates that said user equipment has a capability of handling the increased interference caused by such cell selection offset that is worse than a preselected level.

9. The method according to claim 8, wherein said predetermined fraction is zero.

10. The method according to claim 8, wherein said set of user equipments comprises all user equipments in said first cell possibly being influenced by a cell selection offset for said second cell.

11. The method according to claim 1, wherein at least one of said first comparison measure and said second comparison measure is computed utilizing gathered statistics concerning estimated present capability of user equipments for handling increased interference under different circumstances.

12. The method according to claim 1, wherein said first base station transmits radio signals with a power that is higher than for radio signals transmitted by said second base station.

13. A network node in a cellular communication system, said network node comprising:
an interface configured to obtain user equipment specific information for a user equipment being present in a first cell, said user equipment specific information comprising information of a prevailing radio situation of said user equipment and information of a present decoding performance of said user equipment;
a processor functionally connected to the interface, the processor configured to:
estimate a present capability of said user equipment for handling increased interference and a measure of a cell selection offset required to cover said user equipment by a second cell, from said user equipment specific information; and
decide on modifying a cell selection offset for handover between said first cell and said second cell, in dependence on said estimated present capability of said user equipment for handling increased interference and said cell selection offset required to cover said user equipment by said second cell, wherein said decision on modifying the cell selection offset is performed by comparing a first comparison measure deduced from said estimated present capability of said user equipment and a second comparison measure deduced from said required cell selection offset,
wherein said interface is further configured to receive feed-back information about capability for handling increased interference from user equipments having performed a handover to said second cell due to a modified cell selection offset after said handover has been completed, and
wherein said processor is further configured to refine the computation of at least one of said first comparison measure and said second comparison measure by said feed-back information.

14. The network node according to claim 13, wherein said processor configured to perform said decision on modifying the cell selection offset is further configured to make said decision in further dependence of expected gains in load sharing and uplink performance.

15. The network node according to claim 13, wherein said user equipment specific information comprises at least one of a channel state information report, link adaptation, a handover measurement report, and sounding reference symbols power measurements.

16. The network node according to claim 13, wherein said processor configured to perform said decision on modifying the cell selection offset is further configured to estimate said first comparison measure as a function of a send bit information value, said send bit information value being a ratio of a number of information bits transmitted to said user equipment by said first base station divided by a number of resource elements utilized for said user equipment by said first base station.

17. The network node according to claim 13, wherein said processor configured to perform said decision on modifying the cell selection offset is further configured to estimate said second comparison measure as a function of a range expansion depth for said user equipment, said range expansion depth being a difference between a received power of a pilot signal from said first base station and a received power of a pilot signal from said second base station.

18. The network node according to claim 17, wherein said processor configured to estimate said second comparison measure is further configured to estimate said second comparison measure as a function dependent on differences in power allocations for Physical Downlink Shared Channel and reference symbols between said first base station and said second base station.

19. The network node according to claim 13, wherein said processor configured to perform said decision on modifying the cell selection offset is configured to decide on modifying a cell selection offset individually for said user equipment only if said comparison between said first comparison measure and said second comparison measure indicates that said user equipment has a capability of handling the increased interference caused by such cell selection offset that is better than a preselected level.

20. The network node according to claim 13, wherein:
said interface configured to obtain said user equipment specific information is configured to obtain user equipment specific information for user equipments of a set of user equipments in at least one of said first cell and said second cell;
said processor configured to estimate said present capability of said user equipment for handling increased interference is configured to estimate a respective present capability of said user equipments in said set of user equipments for handling increased interference and a respective measure of a range extension required to cover said user equipments in said set of user equipments by said second cell; and
said processor configured to perform said decision on modifying the cell selection offset is configured to:
perform said decision on modifying the cell selection offset collectively for all user equipments in said set of user equipments; and
adapt a magnitude of said modified cell selection offset to give a cell area of said second cell that comprises less than or equal to a predetermined fraction of user equipments in said set of user equipments for which said comparison between said first comparison measure and said second comparison measure indicates that said user equipment has a capability of handling the increased interference caused by such cell selection offset that is worse than a preselected level.

21. The network node according to claim 20, wherein said predetermined fraction is zero.

22. The network node according to claim 20, wherein said set of user equipments comprises all user equipments in said first cell possibly being influenced by a cell selection offset for said second cell.

23. The network node according to claim 13, wherein said processor configured to perform said decision on modifying the cell selection offset is configured for computing at least one of said first comparison measure and said second comparison measure utilizing gathered statistics concerning estimated present capability of user equipments for handling increased interference under different circumstances.

24. The network node according to claim 13, wherein said network node is a distributed node.

25. The network node according to claim 13, wherein said first base station is a base station transmitting radio signals with a power that is higher than radio signals transmitted by said second base station.

* * * * *